VOLTAGE CONTROLLED OSCILLATOR WITH SWITCHING CIRCUIT COUPLED THERETO

Filed May 22, 1958

INVENTOR.
Richard F. Blake
BY
Gerald Durstewitz
AGENT

United States Patent Office 3,048,793

Patented Aug. 7, 1962

3,048,793

VOLTAGE CONTROLLED OSCILLATOR WITH SWITCHING CIRCUIT COUPLED THERETO

Richard F. Blake, Mountain Lakes, N.J., assignor to Specialties Development Corporation, Belleville, N.J., a corporation of New Jersey Filed May 22, 1958, Ser. No. 737,094
7 Claims. (Cl. 331—75)

The present invention relates to relays, and, more particularly, to an electronic relay which provides electrical isolation between the controlling circuit and the controlled circuit.

As a result of the present day emphasis on electrical and electronic control of precision equipment, there is an ever increasing demand for highly accurate, stable, efficient and rapidly operating devices capable of starting and stopping the current flow in one circuit in response to a condition in another circuit while maintaining electrical isolation between the circuits.

The common type of relay in which a coil connected to the controlling circuit magnetically actuates a moveable contact in the controlled circuit, provides the desired electrical isolation between the circuits. However, relays of this type, even in their most refined forms, have many inherent disadvantages which make them unsatisfactory for many applications. Such relays are sensitive to environmental conditions, in that, shock and vibration tend to shift the moveable contact with respect to the stationary contacts, the contacts are subject to corrosion, contamination and pitting, and the coil varies in resistance according to temperature thus causing the voltage necessary to actuate the relay to vary. Relays of this type also have high hysteresis, that is, in order to make an energized relay "drop out," it is necessary to reduce the voltage impressed upon the coil to a value considerably below the voltage necessary to cause actuation. In addition, such relays operate rather slowly (one millisecond being the typical minimum time required) and the speed of operation of any particular relay can be increased only by increasing the power supplied to the coil thereby decreasing the power gain of the relay (i.e., the ratio of the power in the controlled circuit to the power supplied to the coil).

Accordingly, an object of this invention is to provide an electronic relay which does not have the above disadvantages.

Another object is to provide an electronic device capable of starting and stopping the current flow in one circuit in response to a condition in another circuit while maintaining electrical isolation between the circuits.

Another object is to provide a device of this type which is accurate, stable, and efficient.

A further object is to provide a relay which is insensitive to environmental conditions, operates very rapidly, and has low hysteresis and a high power gain.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention the foregoing objects are accomplished by providing an oscillator having terminals for connection to the controlling circuit and adapted to go into oscillation in response to an electrical condition in the controlling circuit; and a switching circuit coupled to the oscillator and having terminals for connection to the controlled circuit to control the flow of current in the controlled circuit in response to the operation of the oscillator.

A preferred embodiment of the invention has been chosen for purposes of illustration and description, and is shown in the accompanying drawing, forming a part of the specification, wherein.

Figures 1, 2:
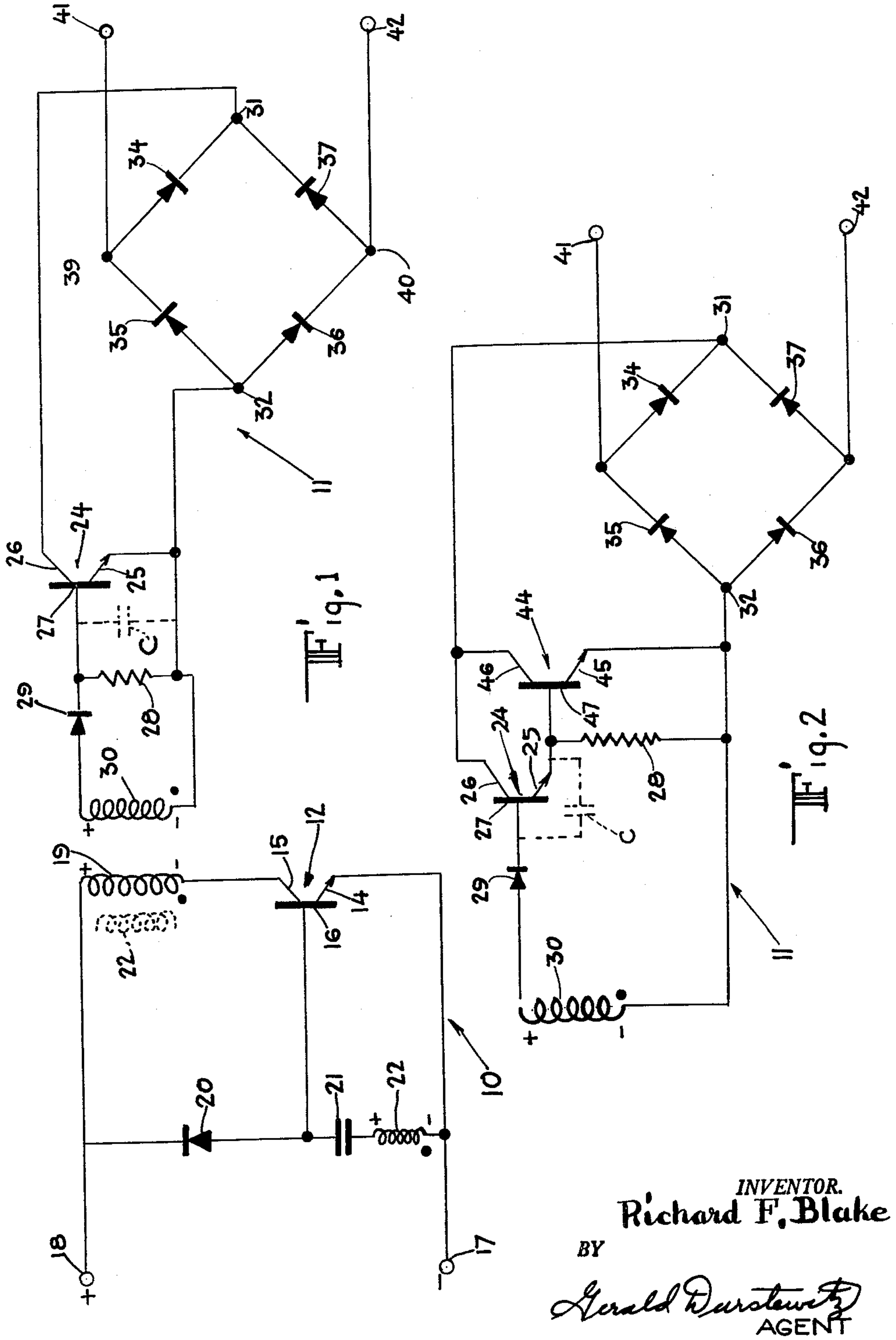
FIG. 1 is a circuit diagram of an electronic relay in accordance with the present invention.
FIG. 2 illustrates a modification of the relay circuit shown in FIG. 1.

Referring to the FIG. 1 in detail, there is shown an electronic relay in accordance with the present invention which generally comprises an oscillator circuit 10 and a switching circuit 11.

The oscillator circuit 10 includes a NPN type transistor 12 having an emitter 14, a collector 15, and a base 16. The emitter 14 is connected to a terminal 17 provided for connection to a controlling circuit, and the collector 15 is connected through an inductance 19 to a second terminal 18 also provided for connection to the controlling circuit. A zener diode 20 provides a connection between the terminal 18 and the base 16 of the transistor, and the base 16 is also connected to the emitter 14 through a capacitor 21 and an inductance 22 arranged in series.

The inductance 22 is inductively coupled to the inductance 19, as shown in broken lines, so that the polarity (positive or negative) of the dot end of the inductance 19, due to the direction of the current flowing therethrough, is the same as the polarity of the dot end of the inductance 22 due to the voltage induced therein by the field of the inductance 19.

The switching circuit 11 includes a NPN type transistor 24 having an emitter 25, a collector 26, and a base 27. The base 27 is connected to the emitter 25 through a diode 29 and an inductance 30 in series with the diode and inductively coupled to the inductance 19 in the oscillator circuit in the same manner as inductance 22. A resistance 28 is also conected between the base 27 and the emitter 25. The emitter 25 and the collector 26 are connected to output terminals 32 and 31 of a rectifying bridge having diodes 34, 35, 36 and 37, each disposed in one of the bridge legs, and having input terminals 39 and 40 connected to terminals 41 and 42 provided for connection to the external circuit to be controlled.

In operation, the terminals 17 and 18 of the oscillator circuit 10 are connected to a circuit (not shown) through which a control signal is transmitted, and the terminals 41 and 42 of the switching circuit are connected to a circuit (not shown) in which the current flow is to be controlled.

When a voltage having the polarity indicated in the drawing is applied across terminals 17 and 18, current will flow from terminal 18, through the zener diode 20, and through the base-emitter circuit of transistor 12 to the terminal 17. If the signal voltage is below the break down potential of the zener diode 20, the diode will pass only a very small leakage current which is not sufficient to cause a current flow in the collector circuit of the transistor, therefore, the oscillator circuit remains quiescent.

When the signal voltage reaches the break down potential of the diode 20, the diode begins to conduct more heavily, driving the base 16 positive with respect to the emitter 14. The resulting increased current flow in the base-emitter circuit induces collector current to flow from the terminal 18, through the inductance 19, and through the collector-emitter circuit of the transistor 12 to the terminal 17. The current flow through the inductance 19 causes its dot end to become negative with respect to the terminal 18, and as this flow increases from zero it produces an expanding magnetic field about the inductance 19 which induces in the inductance 22 a voltage having the polarity indicated in the drawing. This induced voltage drives the base 16 more positive with respect to the emitter 14, increasing the base and collector currents sharply and placing the diode 20 in a non-conducting state. As long as the collector current increases at an increasing rate, the voltage induced in the inductance 22 continues to increase, thereby driving the base 16 more positive. During this period, the capacitor 21 is charging in such a manner that the electrode thereof connected to the base is negative. The rate at which the capacitor is charging is less than the rate at which the voltage induced in inductance 22 is increasing, therefore, the base to emitter voltage, which is equal to the induced voltage minus the capacitor charge, is always increasing for this period. When the collector current reaches saturation, the field about inductance 19 becomes static and no voltage is induced in inductance 22. For a short period, the storage in the transistor maintains the base current constant holding the collector current at saturation, then as the dissipation of the stored charge causes the base current to decrease, the collector current decreases and the field about the inductance 19 begins to collapse. This collapsing field induces a voltage in the inductance 22 (opposite in polarity to that formerly induced) which drives the base below cutoff. As the base 16 becomes negative with respect to the emitter 14, the diode 20 conducts, thereby allowing the capacitor 21, which is charged so as to hold the transistor in its non-conducting state, to discharge through the inductance 22. The circuit then rests until the negative bias has been removed from the base and then repeats its cycle.

This oscillator circuit produces a wave form having a sharp leading edge, and since the circuit cuts itself off after each cycle of operation, it may be classified as a blocking oscillator of the single swing type. It has been found that optimum relay operation is achieved if the oscillator circuit has a high pulse repetition frequency, for example, 100 kilocycles per second.

During the portion of the oscillator cycle when the current flow through the inductance 19 is increasing (producing the leading edge of the wave form), the expanding magnetic field created about this inductance induces voltage in the inductance 30 which has the polarity indicated in the drawing, and therefore causes a current to flow in the base-emitter circuit of the transistor 24. When the field about the inductance 19 collapses, a voltage having the opposite polarity is induced in the inductance 30, and the diode 29 prevents the base 27 from being driven negative.

The transistor 24 has a base to emitter interelectrode capacitance that may be considered to act as an external capacitance C, shown in broken lines, which charges when the diode 29 is conducting and discharges through the transistor when the diode 29 is not conducting. Thus, while the oscillator is in operation, a current continuously flows in the base-emitter circuit placing the transistor in a conducting condition and thus providing a current path between the terminals 41 and 42 through the collector-emitter circuit. If the circuit to be controlled is an alternating current circuit, current will flow alternately from the terminal 41 through the diode 34, the transistor 24, and the diode 36 to the terminal 42, and from the terminal 42 through the diode 37, the transistor 24 and the diode 35 to the terminal 41. If the controlled circuit is a direct current circuit, then, obviously, current will flow in only one of the aforementioned current paths.

When the oscillator circuit 10 is not in operation, the current flow between the terminals 41 and 42 is dependent upon the collector to emitter resistance of the non-conducting transistor 24. At room temperature this resistance is very high and a very small leakage current flows. As the ambient temperature increases, the collector-emitter resistance decreases because of the negative temperature coefficients of the semi-conductor materials of which the transistor is composed, and the current flow through the transistor increases.

As the current flow increases, a voltage drop appears across the terminals of the base 27 and the emitter 25 making the base positive with respect to the emitter, thus causing an additional current to flow between the base and the emitter, which is amplified by the transistor to increase the collector current.

To prevent this increase in leakage current at elevated temperatures, the resistance 28 is connected between the base 27 and the emitter 25 to provide a parallel current path thus reducing the current flowing through the transistor between the base and emitter.

The following table illustrates, by way of example, a particular set of components with which the oscillator and switch circuit shown in FIG. 1 and just described have operated successfully.

*Table I*

| | |
|---|---|
| Transistor 12 | 30 volt, low gain, silicon, audio amplifier type transistor. |
| Pulse transformer having a 1:1:1 turn ratio: | |
| Inductance 19 | 0.47 millihenry. |
| Inductance 22 | 0.47 millihenry. |
| Inductance 30 | 0.47 millihenry. |
| Zener diode 20 | 8 volt ± 5% zener diode. |
| Capacitor 21 | 500 micromicrofarads. |
| Transistor 24 | 30 volt, medium gain, silicon audio amplifier type transistor. |
| Diode 29 | General purpose silicon diode. |
| Resistor 28 | 10,000 ohms. |

The relay embodying the above components was found to have the following operating characteristics:

*Table II*

| | |
|---|---|
| Design initiating signal voltage | 8 volts. |
| Variation in initiating signal voltage throughout temp. range −55° C. to +100° C | 5%. |
| Drop-out signal voltage | Within 5% of initiating voltage. |
| Operating time | ON 2 microseconds. |
| Operating time | OFF 5 microseconds. |
| Contact rating (terminals 41 and 42): | |
| (*a*) Current flow (closed circuit) | 20 milliamps max. |
| (*b*) Voltage (open circuit) | 28 volts max. |
| Power gain | 50 to 1. |
| Open circuit resistance (terminals 41 to 42) | 200 megohms at 25° C. (room temp.). |
| Closed circuit resistance (terminals 41 to 42) | 100 ohms. |
| Pulse repetition frequency of oscillator | 100 kc. |

Through the proper choice of circuit components, the design initiating voltage and the contact rating of the relay shown in FIG. 1 may be varied within the limits of the available components to fit particular requirements without materially affecting the low hysteresis rapid operation, high power gain, or environmental insensitivity of the relay.

It has been found that the power gain of the relay may be greatly increased by modifying the switching circuit 11 as shown in FIG. 2 wherein a second transistor 44 is added to the switching circuit of FIG. 1.

In the circuit of FIG. 2, elements similar to elements in the circuit of FIG. 1 bear identical reference characters.

The transistor 44 has its emitter 45 and its collector 46 connected to the rectifying bridge output terminals 32 and 31 respectively, and its base 47 is connected to the emitter 25 of the transistor 24. The diode 29 and the inductance 30 are connected in series between the emitter 45 of transistor 44 and the base 27 of the transistor 24, and the resistance 28 is connected between the emitter 45 and the base 47 of the transistor 44. The transistor 44 is so chosen that it is capable of handling a greater collector current than the transistor 24 and will conduct only when its base current is greater than the maximum collector leakage current of transistor 24 throughout the designed temperature range of the relay.

In operation, the voltage induced in the inductance 30 causes a current to flow through the transistor 24 from the base 27 to the emitter 25 as described in connection with the operation of the switching circuit shown in FIG. 1. This current causes the transistor 24 to conduct thereby allowing a current to flow from the terminal 31, through the collector emitter circuit of transistor 24, and through the base-emitter circuit of transistor 44 to terminal 32. This current flow has a magnitude equal to the product of the base current and the amplification factor of the transistor 24 and causes the transistor 44 to conduct allowing a current to flow between terminals 41 and 42 which has a magnitude equal to the product of the base current and the amplification factor of the transistor 44.

It has been found that the power gain of the relay is increased to 1000 to 1 by using the modified switching circuit shown in FIG. 2. It has also been found that the current handling capacity of the relay may be increased to 2.5 amperes by using a power transistor as transistor 44 and a high gain audio amplifier transistor as transistor 24. The resistor 28 when used in conjunction with the power transistor had a resistance of 100 ohms.

If it is desired, two or more switching circuits 11 may be operated from the same oscillator circuit to control a plurality of circuits simultaneously.

From the foregoing, it will be seen that the present invention provides an accurate, stable, and efficient relay which is insensitive to environmental conditions, operates very rapidly, has low hysteresis, has a high power gain, and maintains electrical isolation between the controlling and controlled circuits.

As various changes may be made in the form, construction and arrangement of the parts herein, without departing from the spirit and scope of the invention and without sacrificing any of its advantages, it is to be understood that all matter herein is to be interpreted as illustrative and no in any limiting sense.

I claim:

1. In a relay for controlling the current flow in one circuit in response to a condition in another circuit, the combination of an oscillator having terminals for connection to the controlling circuit and being constructed and arranged to be powered solely by electrical energy drawn from the controlling circuit and including means for preventing the oscillation of said oscillator when the voltage impressed thereon is within a predetermined range; and a switching circuit coupled to said oscillator and having terminals for connection to the controlled circuit to control the flow of current in the controlled circuit in response to the operation of said oscillator.

2. In a relay for controlling the current flow in one circuit in response to a condition in another circuit the combination of an oscillator having terminals for connection to the controlling circuit and being constructed and arranged to be powered solely by electrical energy drawn from the controlling circuit and including means for preventing the oscillation of said oscillator when the voltage impressed thereon is within a predetermined range; and a switching circuit having terminals for connection to the controlled circuit and including an electronic valve having its output circuit connected to said terminals to provide a current path therebetween and having its input circuit coupled to said oscillator to control the flow of current between said terminals in response to the operation of said oscillator.

3. In a relay for controlling the current flow in one circuit in response to a condition in another circuit, the combination of a transistor blocking oscillator circuit constructed and arranged to be powered solely by electrical energy drawn from the controlling circuit including terminals for connection to the controlling circuit, and means for preventing said oscillator circuit from operating when the voltage impressed thereupon by the controlling circuit is within a predetermined range; and an electronic valve switching circuit coupled to said oscillator circuit and having terminals for connection to the controlled circuit to control the flow of current in the controlled circuit in response to the operation of said oscillator circuit.

4. In a relay for controlling the current flow in one circuit in response to a condition in another circuit, the combination of an oscillator circuit constructed and arranged to be powered solely by electrical energy drawn from the controlling circuit having terminals for connection to the controlling circuit and including means for preventing said oscillator circuit from operating when the voltage impressed thereupon by the controlling circuit is within a predetermined range, and an inductance constructed and arranged to produce a magnetic field in response to the operation of said oscillator circuit; and a switching circuit having terminals for connection to the controlled circuit and including switching means connected to said terminals to provide a current path therebetween, and a second inductance connected to said switching means and inductively coupled to said first inductance to operate said switching means in response to the operation of said oscillator circuit.

5. In a relay for controlling the current flow in one circuit in response to a condition in another circuit, the combination of a transistor blocking oscillator circuit constructed and arranged to be powered solely by electrical energy drawn from the controlling circut and including terminals for connection to the controlling circuit, means for preventing the operation of said oscillator circuit when the voltage impressed thereupon by the controlling circuit is within a predetermined range, and an inductance constructed and arranged to produce a magnetic field in response to the operation of said oscillator circuit; and a switching circuit having terminals for connection to the controlled circuit and including a transistor having its output circuit connected to said terminals to provide a current path therebetween, and a second inductance in the input circuit of said transistor electromagnetically coupled to said first inductance to control the conductive state of said transistor in response to the operation of said oscillator circuit.

6. In a relay for controlling the current flow in one circuit in response to a condition in another circuit, the combination of a single swing blocking oscillator circuit constructed and arranged to produce a waveform having a sharp leading edge including terminals for connection to the controlling circuit, an electronic valve having an input circuit connected across said terminals and an output circuit, a feedback circuit inductively coupled to said output circuit and connected across said input circuit including a capacitor having a high resistance discharge path when said valve is conducting, and means for providing a low resistance discharge path for said capacitor when said valve is not conducting, said last mentioned means including a zener diode connected in series with said capacitor between said terminals; and a switching circuit inductively coupled to said oscillator circuit and having terminals for connection to the controlled circuit, said switching circuit being responsive to the leading edge of the oscillator circuit waveform to control the flow of current in the controlled circuit.

7. A blocking oscillator circuit comprising a pair of input terminals, an electronic valve having an input circuit connected between said terminals and including a control electrode, a capacitor connected to said control electrode to hold said valve cutoff between periods of operation of said oscillator circuit, and a zener diode connected to said capacitor and in series with said input circuit and said terminals to provide a low resistance discharge path for said capacitor when said valve is cutoff and to prevent the operation of said oscillator circuit when the potential at the input terminals is below a predetermined value.

References Cited in the file of this patent

UNITED STATES PATENTS

| | | |
|---|---|---|
| 2,751,550 | Chase | June 19, 1956 |
| 2,757,243 | Thomas | July 31, 1956 |
| 2,791,739 | Light | May 7, 1957 |
| 2,846,581 | Volkers | Aug. 5, 1958 |
| 2,877,360 | Moore et al. | Mar. 10, 1959 |
| 2,906,893 | Mattson | Sept. 29, 1959 |
| 2,907,919 | Sonnenfeldt | Oct. 16, 1959 |
| 2,939,088 | Hodges | May 31, 1960 |